US010323340B2

(12) United States Patent
Gschliesser

(10) Patent No.: US 10,323,340 B2
(45) Date of Patent: Jun. 18, 2019

(54) PROCESS FOR CALIBRATING THE LOADING FORCE OF A BREAKER ELEMENT OF A BALE OPENER AND THE BALE OPENER

(71) Applicant: Maschinenfabrik Rieter AG, Winterthur (CH)

(72) Inventor: Gerhard Gschliesser, Winterthur (CH)

(73) Assignee: Maschinenfabrik Rieter AG, Winterthur (CH)

( * ) Notice: Subject to any disclaimer, the term of this patent is extended or adjusted under 35 U.S.C. 154(b) by 239 days.

(21) Appl. No.: 15/486,375

(22) Filed: Apr. 13, 2017

(65) Prior Publication Data

US 2017/0298541 A1 Oct. 19, 2017

(30) Foreign Application Priority Data

Apr. 15, 2016 (CH) ........................................ 0498/16

(51) Int. Cl.
*D01G 7/12* (2006.01)
*D01G 23/08* (2006.01)
*G01L 25/00* (2006.01)
*D01G 7/06* (2006.01)

(52) U.S. Cl.
CPC .............. *D01G 23/08* (2013.01); *D01G 7/06* (2013.01); *G01L 25/006* (2013.01)

(58) Field of Classification Search
None
See application file for complete search history.

(56) References Cited

U.S. PATENT DOCUMENTS 4,750,240 A * 6/1988 Temburg ................. D01G 7/12 19/80 R
4,785,504 A * 11/1988 Leifeld .................... D01G 7/04 19/80 R
5,079,800 A * 1/1992 Leifeld .................... D01G 7/14 19/80 R
5,090,090 A * 2/1992 Temburg ................. D01G 7/10 19/80 R (Continued)

FOREIGN PATENT DOCUMENTS

CH 710 257 A1 4/2016
CN 104674385 A 6/2015

(Continued)

OTHER PUBLICATIONS

Swiss Patent Office Search Report, dated Aug. 11, 2016.

*Primary Examiner* — Natalie Huls
*Assistant Examiner* — Mohammed E Keramet-Amircolai
(74) *Attorney, Agent, or Firm* — Dority & Manning, P.A.

(57) ABSTRACT

A process for calibrating the loading force of a breaker element of a bale opener on a bale group includes: (a) setting a force sensor used to measure the loading force at no load; (b) lowering the breaker element onto the bale group until reaching a loading force that is at least twice as high as an upper loading force at which the breaker element receives a lift command during normal breaking operation; (c) relieving the load on the breaker element; (d) setting the loading force at a negative value which includes signal distortion influences; and (e) lowering the breaker element until the loading force measured by the load sensor reaches at least the level of the upper loading force.

14 Claims, 2 Drawing Sheets

(56) References Cited

U.S. PATENT DOCUMENTS

| | | | | |
|---|---|---|---|---|
| 5,105,507 A * | 4/1992 | Staheli | ............... | D01G 7/10 19/80 R |
| 5,105,508 A * | 4/1992 | Aebli | ............... | D01G 7/12 19/80 R |
| 5,136,155 A * | 8/1992 | Kyburz | ............... | D01G 31/00 250/221 |
| 5,189,308 A * | 2/1993 | Kortlang | ............... | D01G 7/10 19/80 R |
| 5,328,016 A * | 7/1994 | Leifeld | ............... | D01G 7/06 19/80 R |
| 5,495,642 A * | 3/1996 | Trutzschler | ............... | D01G 7/14 19/80 R |
| 5,515,577 A * | 5/1996 | Pinto | ............... | D01G 7/10 19/80 R |
| 5,564,165 A * | 10/1996 | Zander | ............... | D01G 7/10 19/80 R |
| 5,768,750 A * | 6/1998 | Williams | ............... | D01G 7/08 19/80 R |
| 5,933,921 A * | 8/1999 | Jossi | ............... | D01G 31/003 19/200 |
| 6,170,341 B1 * | 1/2001 | Avitan | ............... | B66F 17/003 73/862.392 R |
| 7,506,410 B2 | 3/2009 | Minter | | |
| 2006/0207064 A1 * | 9/2006 | Minter | ............... | D01G 7/06 19/80 R |
| 2013/0042770 A1 * | 2/2013 | Verhaeghe | ............... | A01F 15/0825 100/35 |
| 2016/0108558 A1 * | 4/2016 | Schmid | ............... | D01G 7/14 19/80 R |
| 2016/0108559 A1 * | 4/2016 | Schmid | ............... | D01G 7/12 19/80 R |

FOREIGN PATENT DOCUMENTS

| | | |
|---|---|---|
| DE | 39 32 281 A1 | 4/1991 |
| DE | 44 22 574 A1 | 3/1995 |
| EP | 1 659 082 A2 | 5/2006 |
| EP | 2 322 701 A1 | 5/2011 |
| EP | 3 009 539 A1 | 4/2016 |

* cited by examiner

PROCESS FOR CALIBRATING THE LOADING FORCE OF A BREAKER ELEMENT OF A BALE OPENER AND THE BALE OPENER

TECHNICAL FIELD

The invention relates to a process for calibrating the loading force of a breaker element of a bale opener and the bale opener according to the independent claims.

BACKGROUND

Breaker elements (also known as stripper elements) are used in so-called bale breaker machine components of bale openers to loosen fibers or fiber flocks out of pressed fiber bales. To do so, the breaker element is moved over the fiber bales.

The bale opener stands at the beginning of process lines in a spinning preparatory (cleaning) machine for processing fiber material, for example, cotton or synthetic fibers or blends thereof and has a significant influence on the continuity of the sequences within the spinning preparatory machine. In the bale breaker machine, the fiber material supplied in bales is loosened from the bales by breaking up fiber flocks and then is transferred to a pneumatic transport system. The pneumatic transport system brings the fiber flocks through pipelines to the downstream cleaning machines. The breaker element is mounted on a movable breaker tower where it can be adjusted in height. The breaker element comprises one or more breaker rollers with teeth mounted on the surface, a restraining element mounted beneath the breaker roller, and a suction hood. Through the movement of the breaker element along the fiber bale, the teeth grip the fiber bales and tear or pull fibers or fiber flocks out of the fiber bale through the rotation of the breaker roller. The fiber flocks thus pulled out are transferred from the breaker roller through the suction hood connected to a vacuum source and supplied to the transport system.

DE4422574A1 discloses, for example, a process for breaking fiber flocks out of textile fiber bales (for example, cotton) by means of a breaker element that can be lowered onto the fiber bales and then moved back and forth over the bales, loosening the fiber flocks from the surface of the bales, and transferring them to a flock transport system wherein the height of the bale is subdivided into at least three breaker zones. To permit optimal processing of the fiber flocks, namely uniform production output and a uniform flock size, the rate of travel of the wagon with the breaker element is adjusted as a function of the bale height.

EP2322701A1 discloses a bale opener, which can be moved at a constant force or a constant height, depending on process conditions. Control is automatic as a function of conditions of the breaker element and of the type of process. U.S. Pat. No. 7,506,410 discloses a bale opener having a movable distance sensor.

The loading force of the contact element of the bale opening must now be measured continuously. However, tests and measurements have shown that the determination of the loading force of the breaker element on the bales is subject to a great many interfering influences such as, for example, the fact that the raising and lowering movements alter the signal, depending on the level at which the breaker element is located at the moment, friction on the rollers that may cause wear, vibrations due to the breaking operation, measurement precision (filters used), etc. Some of these interfering influences are additive, possibly resulting in a measurement inaccuracy of up to ±20 kg or even more in some cases. For example, if a bale group is to be scanned with a 20 kg loading force, this would in some cases result in the breaker element being "in the air" instead of gripping the bales because the controller would assume, due to false measured values, that the breaker element is resting on the bale at 20 kg.

Therefore, before the actual scanning operation is started, the breaker element is lowered slowly until reaching the set loading force, for example, the average of an upper loading force (i.e., raising the breaker element) and a lower loading force (i.e., lowering the breaker element) and it was thus assumed that the breaker element is resting on the bale group at the set loading force. Then the longitudinal drive was turned on and the breaker element was moved up or down accordingly in proportion to the loading force, so that the loading force would come to lie between the minimum and the maximum loading force settings. However, this would lead to the problems described above.

SUMMARY OF THE INVENTION

An object of the invention is thus to create a process and a bale opener, which avoid the disadvantages encountered in the prior art.

Another object of the invention is to create a process and a bale opener, which will allow table and reliable scanning of the bale groups.

Yet another object of the invention is to create a process and a bale opener, which will reliably adjust the loading force despite the prevailing interfering influences.

Yet another object of the invention is to create a process and a bale opener, which will prevent the bale opener from being torn out of the rails by the scanning element being lowered too low.

Additional objects and advantages of the invention will be set forth in part in the following description, or may be obvious from the description, or may be learned through practice of the invention.

These objects are achieved by a process and by a bale opener having the features described and claimed herein.

These objects are achieved by a process for calibrating the loading force of a breaker element of a bale opener comprising the following process steps in particular:
(a) Setting a force sensor at zero;
(b) Lowering the breaker element onto the bale group until achieving a loading force equal to at least twice the upper loading force at which the breaker element receives the command to lift during the breaking, wherein the loading force is measured with the force sensor;
(c) Releasing the scanning element;
(d) Setting the loading force measured with the force sensor at a negative value which includes signal distortion influences; and
(e) Lowering the breaker element until the loading force has reached at least the upper loading force.

These objects are also achieved by a bale opener for carrying out the process according to the invention, wherein the bale opener comprises the following features:
a breaker element having a force sensor;
means for raising and lowering the breaker element onto a bale group;
a controller, so that a lowering movement of the breaker element occurs when a lower loading force is reached and a lifting movement occurs when the upper loading force has been reached;

means for predefining an upper and a lower loading force of the breaker element;

means for setting the loading force of the breaker element measured by the force sensor, and means for longitudinal guidance of the breaker element along the bale group.

The process according to the invention here advantageously ensures a stable and reliable scanning of the bale groups by means of a compact force measurement.

During the longitudinal movement of the breaker element along the bale group, the force is measured continuously using the calibrated force sensor and there is a lowering movement of the breaker element when a lower loading force is reached and there is an upward lifting movement when an upper loading force is reached. The upper and lower loading forces of the breaker element are preselected by the user and thus determine the following breaking process.

The breaker element is raised by a predetermined amount to reduce load on the breaker element and lowered by a predetermined amount, so that the breaker element remains at a no-load level. It may also be advantageous to wait at least one second between the raising and the lowering, and also after the lowering, and the lowering may take place at a lower rate than the raising. This ensures that a release of the load, which is a reliable indicator of adjustment of the loading force in the subsequent process.

In lowering the breaker element, it may be advantageous to achieve a loading force equal to 1.25 to 2 times the upper loading force. This embodiment achieves the result that the breaker element sits reliably on the bale group before the actual breaking operation and starts with good breaking of the material of the bales.

To prevent a damage incident, the torque of a motor responsible for the lifting movement and the loading force may be measured. The lowering movement is then stopped when a maximum value of one of the two variables is exceeded. Alternatively, a minimum height of the breaker element can also be calculated continuously, and the bale opener can be stopped when the minimum height has been reached. This embodiment prevents excessive lowering of the breaker element so that the latter would have to be torn on the floats.

According to an advantageous embodiment, the longitudinal position of the breaker element along the bale group can be determined by means of continuous barcodes placed in the lower area of the bale group. For the position determination, a barcode reader is used, scanning the barcodes continuously and returning an absolute length value. To this end, a plurality of barcodes is always detected simultaneously, and the position determination of the breaker element is carried out using this information. This embodiment advantageously yields improved options for monitoring the bale opener.

The invention also relates to a computer program product, which can be loaded directly into an internal memory of a bale opener according to the invention and comprises software code segments with which the process steps of the process according to the invention can be carried out when the product is running on the bale opener.

Additional advantages of the invention can be derived on the basis of an exemplary embodiment which is presented and described below.

BRIEF DESCRIPTION OF THE FIGURES

The invention will now be explained in greater detail on the basis of the accompanying figures, in which.

DETAILED DESCRIPTION

Figure 1:
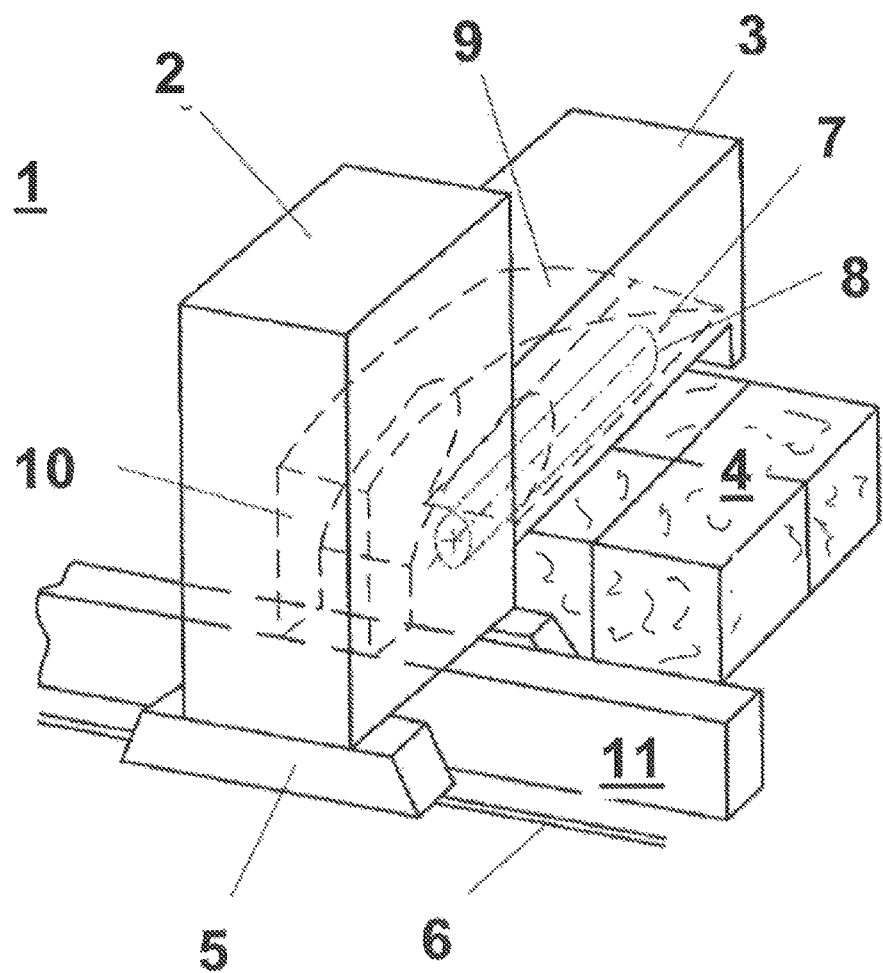
FIG. 1 shows a schematic diagram of a bale opener.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Features that are important only for the invention are described. The same reference numerals are used to designate the same features in different figures.

FIG. 1 shows in a schematic diagram a bale opener 1 according to the invention. The bale opener 1 consists essentially of a breaker tower 2 and a breaker element 3. The breaker element 3 is mounted on one side of the breaker tower 2 and is arranged so that it is freely cantilevered over the bale group 4. The breaker tower 2 is equipped with a running gear 5. With the help of the running gear 5, the breaker tower 2 is moved on rails 6 along the bale group 4. Due to this movement, the breaker element 3 mounted on the breaker tower 2 is guided over the surface of the bale group 2 situated beneath it. The mount of the breaker element 3 on the breaker tower 2 is designed to be adjustable in height so that the bale group 4 can be broken out or stripped continuously. A breaker roller 7 with an axle 8 is arranged in the breaker element 3. The breaker roller 7 draws fiber flocks out of the bale group 4. The fiber flocks are picked up by the breaker roller 7 and carried by means of a vacuum via a suction hood 9 to the breaker tower 2. A transport channel 10, which picks up the fiber flocks from the suction hood 9 and sends them to a pneumatic fiber flock transport system 11, is arranged in the breaker tower 2. The transport channel 10 and thus also the suction hood 9 are under a certain vacuum, which serves to pneumatically convey the fiber flocks to the transport channel 10.

Figure 2:
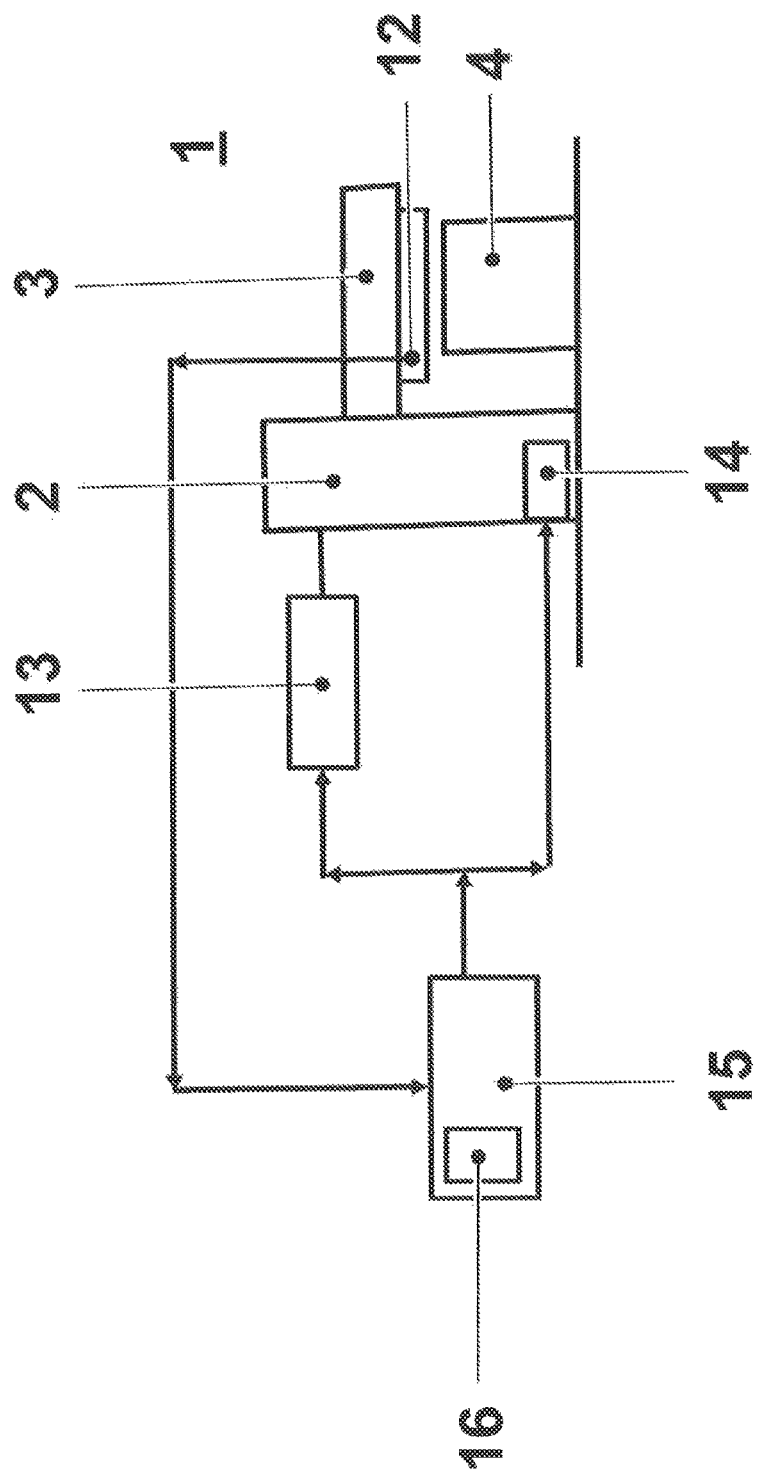
FIG. 2 shows a schematic diagram of the elements involved in the process according to the invention.

FIG. 2 shows a schematic diagram of the elements of the bale opener 1 involved in the process according to the invention. The breaker element 3 is equipped with a force sensor 12, which measures the force exerted by the element 3 on the fiber bales 4. The force sensor is a load cell, for example, or some other suitable sensor that measures the loading force of the breaker element 3. The breaker element 3 is controlled by a motor 13, so that it raises or lowers the breaker element 3 over the bale group. The breaker element 3 is moved along the bale group by means of a second motor 14 in order to break open the bale group 4.

According to the invention, a process for calibrating the loading force of a breaker element 3 of a bale opener 1 on a bale group 4 is disclosed. This process is carried out before the actual breaking operation of the bale group 4 and serves to calibrate the force sensor 12. The force sensor 12 calibrated in this way is used in the following way during the subsequent breaking open of the bale group 4 for the force measurement. During the longitudinal movement of the breaker element 3 along the bale group 4, the force is measured continuously with the force sensor 12 and there is a lowering movement of the breaker element 3 when a lower loading force is reached and an upward lifting movement takes place when an upper loading force is reached. The bale opener 1 provides a controller 15 with an internal memory 16 for this purpose. The controller 15 receives the signals measured by the force sensor 12, analyzes the signals and sends a corresponding command to the first motor 13, which is responsible for controlling the height of the breaker element 3. The controller 15 thus carries out the lowering movement and the lifting movement of the breaker element 3 as a function of the measured loading force. At the same time, both the upper and lower loading force on the breaker element 3 can be predetermined by the user in the controller 15. In addition, the loading force of the breaker element 3 measured by the force sensor 12 can be adjusted by the process according to the invention.

The process according to the invention now comprises the following process steps: in a first process step, the load on the breaker element 3 is reduced, and the force sensor 12 is set at zero, i.e., at no load. To do so, the breaker element 3 is raised above the bale group 4. Next, the breaker element 3 is lowered onto the bale group 4 until reaching a force equal to at least twice the upper loading force. The acting force is then measured with the force sensor 12. In this process step, a loading force that is between three times and six times the upper loading force can be selected advantageously.

The load on the breaker element 3 is reduced in a second process step. This load reduction may advantageously consist of raising the breaker element 3 by a predetermined amount and subsequently lowering the breaker element 3. The predetermined amount is selected, so that the breaker element 3 remains reliably at no load, even after being lowered. To minimize any measurement uncertainty and any fluctuations, a pause of at least one second is maintained between the raising and the lowering, as well as after the lowering. In addition, the lowering may take place at a slower rate than the raising for the same reason.

In a third process step, the loading force measured with the force sensor is set at a negative value. Experiments have shown that the negative value is in a range between 20% and 50% of the upper loading force. This ensures that signal distortion influences are taken into account because subsequent process steps can again have a positive influence on the force measurement. The negative value takes this distortion into account.

In the fourth and last process steps, the breaker element 3 is lowered again until the loading force is at least equal to the upper loading force. The breaker element 3 in this process step can advantageously be lowered until reaching a level equal to 1.25 to 2 times the upper loading force.

By means of the process according to the invention, a stable and reliable scanning of the bale groups 4 by measurement of the loading force is advantageously ensured. Then, the breaker element is moved along the bale group. The breaker element is lowered when the lower loading force is reached and lifted when the upper loading force has been reached.

In another embodiment, the lowered height of the breaker element 3 is additionally monitored. If the breaker element 3 were lowered too low onto a bale group 4, it would result in the bale opener 1 being ripped out of the rails 6. For this reason, according to the invention, the following monitoring measure(s) is (are) implemented. These measures may act redundantly and can thus prevent the damage incident described above. The minimum allowed heights of the breaker element 3 are calculated continuously and independently, i.e., the height below which the breaker element 3 cannot be lowered by means of manual functions or in production operation is calculated depending on the current longitudinal position and which bale group 4 the breaker element 3 is above or outside of a bale group 4. If the height is below the minimum height for the lifting drive according to a driving command, this is not allowed and/or any lowering movement is stopped. This redundant independent monitoring prevents the breaker element 3 from ever being lowered to a level that is too low when there are sequence errors in the controller 15 or when control sequences are altered, so that the bale opener 1 is not ripped out of the rails 6. There was also redundant monitoring of the torque of the first motor 13 and the aforementioned loading force with respect to a maximum value, i.e., when the maximum value of one of these values is exceeded, any lowering movement of the breaker element 3 is stopped.

According to one advantageous embodiment, the longitudinal position of the breaker element 3 along a bale group 4 can be determined by means of barcodes. Continuous barcodes, which are different from one another, are provided on the bale group 4 at a level relatively close to the bottom. A barcode reader, which scans the barcodes continuously and delivers an absolute length value, is used for the position determination. To this end, a plurality of bar codes is always detected simultaneously, and with this information, the position of the breaker element 3 is determined. The beginning and end positions of a bale group 4 can be input via the controller 15. This embodiment advantageously yields improved monitoring options for the bale opener 1.

The invention also relates to a computer program product, which can be loaded directly into the internal memory 16 of a bale opener 1 and comprises software code segments with which the process steps of the process according to the invention can be carried out when the product is running on the bale opener.

Modifications and variations can be made to the embodiments illustrated or described herein without departing from the scope and spirit of the invention as set forth in the appended claims.

LIST OF REFERENCE NUMERALS

1 Bale opener
2 Breaker tower
3 Breaker element
4 Bale group
5 Running gear
6 Rail
7 Application roller
8 Axle
9 Suction hood
10 Transport channel
11 Transport system
12 Force sensor
13 Motor
14 Motor
15 Controller
16 Memory

The invention claimed is:

1. A process for calibrating a loading force of a breaker element of a bale opener on a bale group, comprising the following sequential process steps:
 (a) setting a force sensor used to measure the loading force at no load;
 (b) lowering the breaker element onto the bale group until reaching a loading force measured by the force sensor that is at least twice as high as an upper loading force at which the breaker element receives a lift command during normal breaking operation;
 (c) relieving the load on the breaker element;

(d) setting the loading force measured with the force sensor at a negative value which includes signal distortion influences; and (e) lowering the breaker element until the loading force measured by the load sensor reaches at least the level of the upper loading force.

2. The process according to claim 1, further comprising:

(g) operating the breaker element with longitudinal travel of the breaker element along the bale group and a lowering movement of the breaker element when a lower loading force is reached and an upward lifting movement when the upper loading force is reached.

3. The process according to claim 2, wherein the upper and lower loading force values are predefined.

4. The process according to claim 2, wherein longitudinal position of the breaker element is determined by reading barcodes provided on the bale group.

5. The process according to claim 1, wherein step (c) comprises raising the breaker element by a predetermined amount to reduce the load on the breaker element and lowering the breaker element by a predetermined amount, so that the breaker element still remains at no load.

6. The process according to claim 5, wherein a pause of one second is observed between the raising and the lowering of the breaker element and also after the lowering of the breaker element, and the lowering takes place at a slower rate than the raising.

7. The process according to claim 1, wherein in step (e), the breaker element is lowered until the loading force has reached a level 1.5 to 2 times the upper loading force.

8. The process according to claim 1, wherein a minimum height of the breaker element is calculated continuously, and the bale opener is stopped when the minimum height is reached.

9. The process according to claim 1, wherein the loading force and a torque of a motor used for the lifting movement are measured, and the lowering movement is stopped when a maximum value is exceeded by either one of these variables.

10. A computer program product, comprising a stored computer program that can be loaded directly into an internal memory of a controller of a bale opener, the computer program containing instructions to operate the bale opener according to the method of claim 1.

11. A bale opener, comprising:

a breaker element with a force sensor configured therewith;

means for raising and lowering the breaker element onto and off of a bale group;

a controller interfaced with the means for raising and lowering the breaker element so that there is a lowering movement of the breaker element when a lower loading force is reached, and there is a lifting movement when an upper loading force is reached;

means for longitudinal movement of the breaker element along the bale group; and wherein the controller is configured with a memory and software to perform the process for calibrating the loading force of the breaker element in accordance with claim 1.

12. The bale opener according to claim 11, wherein the controller is further configured for continuous calculation of a minimum height of the breaker element, and stops the bale opener when the minimum height has been reached.

13. The bale opener according to claim 12, wherein the controller is further configured for monitoring of the loading force of the breaker element and a torque of a motor that supplies the lowering movement to the breaker element, and stops the lowering movement of the breaker element when a maximum value is exceeded by either the torque or the loading force.

14. The bale opener according to claim 12, wherein barcodes are provided on the bale group, and longitudinal position of the breaker element along the bale group is determined by scanning of the barcodes.

* * * * *